US011210446B1

(12) United States Patent
Morgan et al.

(10) Patent No.: US 11,210,446 B1
(45) Date of Patent: Dec. 28, 2021

(54) ISOLATION OF COMPARTMENTS IN A LAYERED PRINTED CIRCUIT BOARD, AND APPARATUS AND METHODS FOR THE SAME

(71) Applicant: Management Services Group, Inc., Virginia Beach, VA (US)

(72) Inventors: Thomas Scott Morgan, Virginia Beach, VA (US); Martin Mayer, Bartlesville, OK (US); Steve Yates, Charlottesville, VA (US)

(73) Assignee: Management Services Group, Inc., Virginia Beach, VA (US)

( * ) Notice: Subject to any disclaimer, the term of this patent is extended or adjusted under 35 U.S.C. 154(b) by 0 days.

(21) Appl. No.: 17/169,703

(22) Filed: Feb. 8, 2021

Related U.S. Application Data

(60) Provisional application No. 63/057,463, filed on Jul. 28, 2020.

(51) Int. Cl.
| | | |
|---|---|---|
| *H05K 3/46* | (2006.01) | |
| *G06F 30/394* | (2020.01) | |
| *H05K 1/02* | (2006.01) | |
| *H05K 1/18* | (2006.01) | |
| *H05K 1/11* | (2006.01) | |
| *G06F 115/12* | (2020.01) | |

(52) U.S. Cl.
CPC ......... *G06F 30/394* (2020.01); *H05K 1/0216* (2013.01); *H05K 1/115* (2013.01); *H05K 1/181* (2013.01); *H05K 3/46* (2013.01); *G06F 2115/12* (2020.01); *H05K 2201/1006* (2013.01); *H05K 2201/10159* (2013.01); *H05K 2201/10613* (2013.01)

(58) Field of Classification Search
CPC ...... H05K 1/0216; H05K 1/115; H05K 1/181; H05K 3/46
See application file for complete search history.

(56) References Cited

U.S. PATENT DOCUMENTS

| | | | | |
|---|---|---|---|---|
| 2002/0121943 | A1* | 9/2002 | Axelrod | H01F 1/15333 333/182 |
| 2004/0008531 | A1* | 1/2004 | Arai | H05K 1/0233 363/144 |
| 2004/0091719 | A1* | 5/2004 | Uchida | H05K 1/0274 428/429 |
| 2010/0230789 | A1* | 9/2010 | Yorita | H01L 23/3121 257/659 |
| 2015/0163962 | A1* | 6/2015 | Suzuki | H05K 1/0203 361/699 |
| 2020/0112075 | A1* | 4/2020 | Myers | H05K 3/4688 |
| 2020/0259234 | A1* | 8/2020 | Watanabe | H01P 1/20345 |

* cited by examiner

*Primary Examiner* — Jeremy C Norris
(74) *Attorney, Agent, or Firm* — Cooley LLP

(57) ABSTRACT

In some embodiments, an apparatus can include a printed circuit board (PCB) that has layers and includes a first portion and a second portion. The first portion can have a data port and a power port. A first layer is associated with data of the first portion of the PCB, and a second layer is associated with power of the first portion of the PCB. The second portion can have a data port and a power port. A third layer is associated with data of the second portion, and a fourth layer is associated with power of the second portion. The first portion or the second portion can have vias defining an electromagnetic interference (EMI) shield. The apparatus can include a power filter and a data filter that can, respectively, isolate power and data of the first portion from the second portion.

18 Claims, 3 Drawing Sheets

Compartmentalized Printed Circuit Board 200

201  First Printed Circuit Board Compartment
*Primary function is to generate, process, store, execute, or communicate sensitive data or software*

202  Isolated Data Port
*Primary function is to transfer only intended data without leakage*

203  Isolated Power Port
*Primary function is to transfer power without unintended leakage*

211  Second Printed Circuit Board Compartment
*Primary function is to generate, process, store, execute, or communicate sensitive data or software*

212  Isolated Data Port
*Primary function is to transfer only intended data without leakage*

213  Isolated Power Port
*Primary function is to transfer power without unintended leakage*

FIG. 2

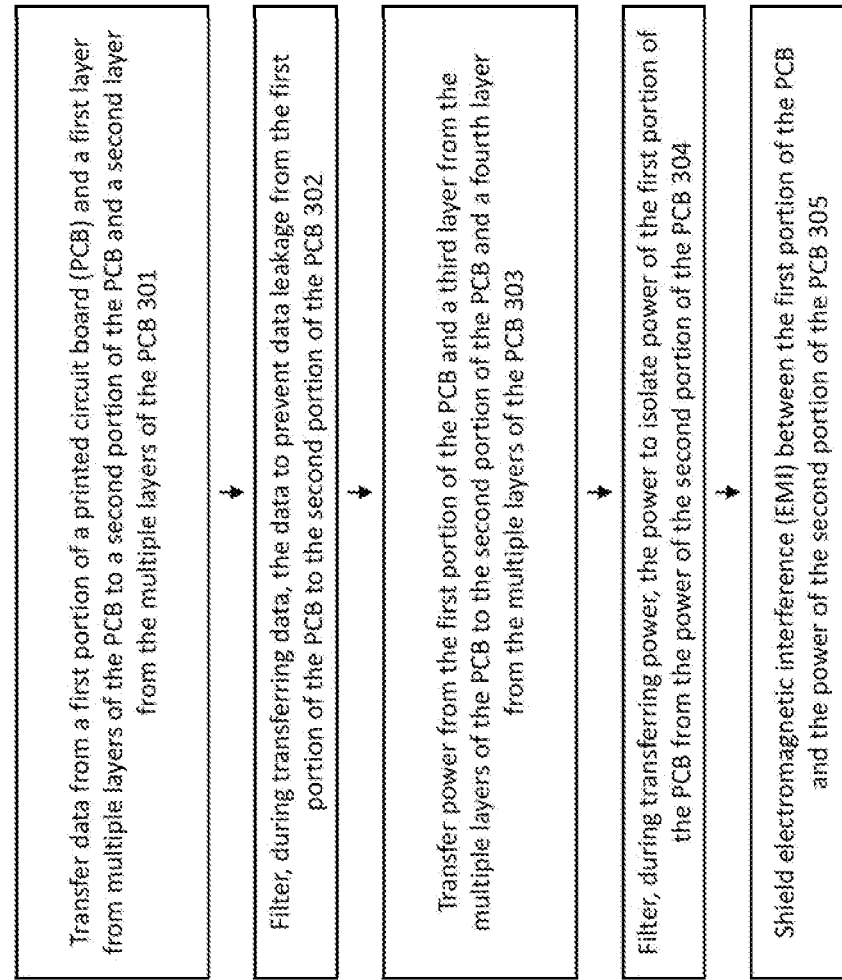

ISOLATION OF COMPARTMENTS IN A LAYERED PRINTED CIRCUIT BOARD, AND APPARATUS AND METHODS FOR THE SAME

CROSS REFERENCE TO RELATED APPLICATION

This application claims priority to and the benefit of U.S. Patent Application No. 63/057,463, filed Jul. 28, 2020 and entitled "Printed Circuit Board Electromagnetic Compartmentalization," which is incorporated herein by reference in its entirety.

TECHNICAL FIELD

The present disclosure relates to the field of computers and embedded computers, and in particular to methods and apparatus related to a layered printed circuit board that includes multiple portions isolated by vias, data filters, and/or power filters for improved security.

BACKGROUND

Known printed circuit boards used in electronic components, computers, or internet of thing (IoT) devices are frequently miniaturized to facilitate reductions in size, weight, power consumption, and/or cost associated with the printed circuit boards. When designing a dense printed circuit board for electronic components, computers, or IoT devices, however, engineers often make compromises, which can result in reductions in security by combining and handling multiple types (e.g., based on sensitivities, classification, owners, and/or the like) of data and software present on the printed circuit board. Miniaturization and combining multiple types of data and software can be a good approach in some known applications in which such inherent security reductions are acceptable, and the security risks can be adequately addressed by known techniques. On the other hand, in some situations where sensitive data and/or software are handled, known dense computer boards can pose unacceptable risks of unauthorized access, monitoring, and/or tampering of sensitive data and/or software. Thus, a need exist for improved printed circuit boards.

SUMMARY

In some embodiments, an apparatus can include a printed circuit board (PCB) having layers and including a first portion and a second portion mutually exclusive and physically separate from the first portion. The first portion can have a data port and a power port. A first layer from the layers is associated with data of the first portion of the PCB, and a second layer from the layers is associated with power of the first portion of the PCB. The second portion can have a data port and a power port. A third layer from the layers is associated with data of the second portion, and a fourth layer from the layers is associated with power of the second portion. The first portion can have vias defining an electromagnetic interference (EMI) shield portion for the first portion. The second portion can have a plurality of vias defining an EMI shield portion for the second portion of the PCB. The apparatus can include a power filter, operatively coupled to the power port of the first portion and the power port of the second portion, which isolates power of the first portion of the PCB from the power of the second portion of the PCB. The apparatus can include data filter, operatively coupled to the data port of the first portion of the PCB and the data port of the second portion of the PCB, which prevents data leakage from the first portion to the second portion.

BRIEF DESCRIPTION OF THE DRAWINGS

FIG. 2 is a block diagram that illustrates a compartmentalized printed circuit board, according to an embodiment.

FIG. 3 is a flowchart of a method for compartmentalization of a printed circuit board, according to an embodiment.

DETAILED DESCRIPTION

Figure 1:
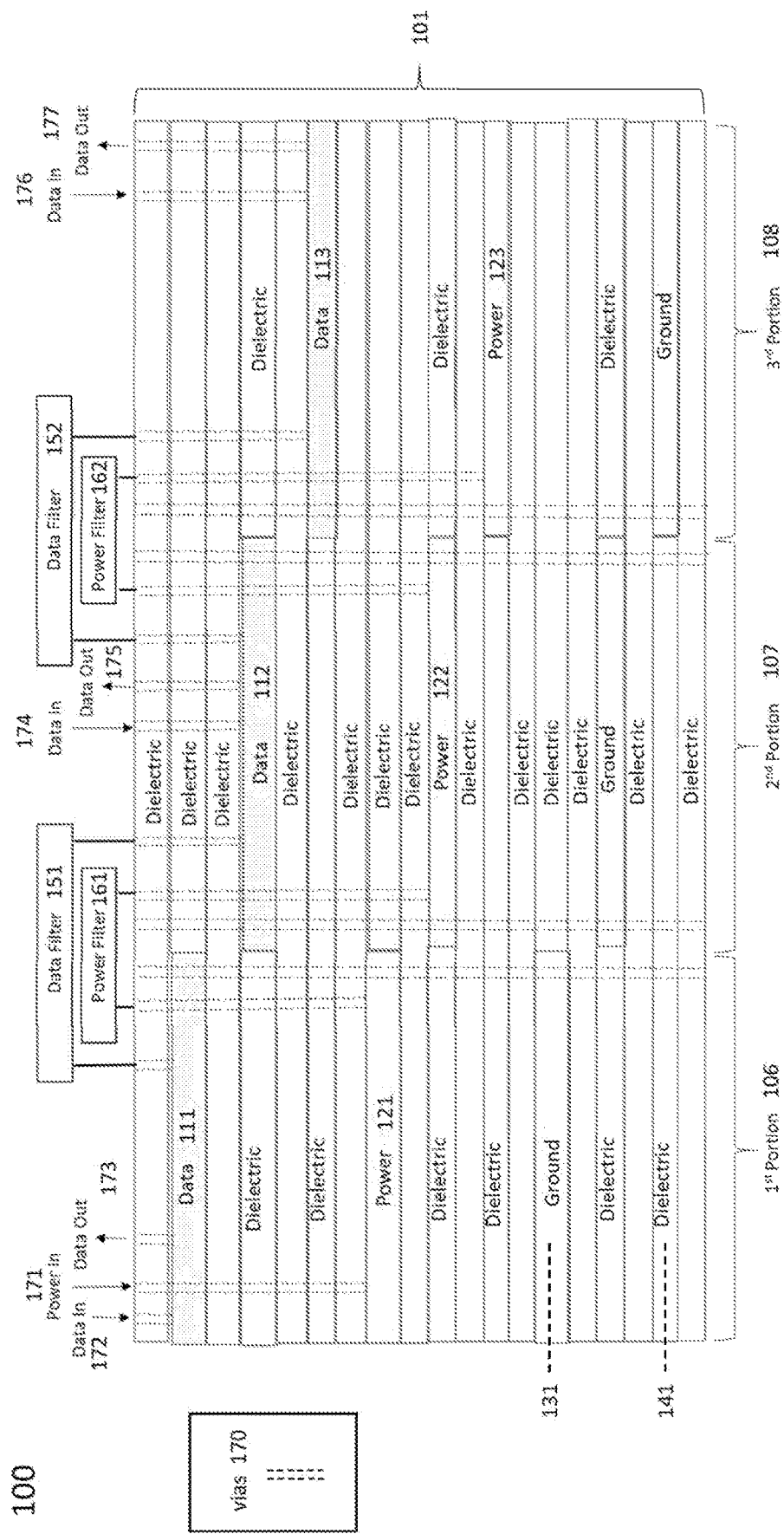
FIG. 1 is a block diagram that illustrates a compartmentalized printed circuit board, according to an embodiment.

Non-limiting examples of various aspects and variations of the embodiments are described herein and illustrated in the accompanying drawings.

One or more embodiments described herein generally relate to methods and apparatus that use compartmentalized printed circuit boards (PCBs) that are suitable for highly secure and reliable computing, storage, and/or communication systems. Compartmentalized PCBs described herein include data filters and include power filters that can change characteristics of power at each compartment (also referred to herein as a "portion") as an extra measure of protection in compromising environments. Moreover, compartmentalizing PCBs described herein, in addition to security, can be beneficial in improved performance and cost reduction. By defining on the PCB compartments that are designed and constructed to achieve electromagnetic and power isolation between the compartments, data processed and software executed by the PCB (or a compute device having the PCB) can be protected from unauthorized access, and the operation of the PCB can be protected against tampering and monitoring.

FIG. 1 is a block diagram that illustrates a compartmentalized printed circuit board 100 (also referred to herein as 'the printed circuit board' or 'the PCB'), according to an embodiment. The compartmentalized PCB 100 includes a layered board 101, data filters 151, 152, power filters 161, 162, data-in ports 172, 174, 16, data-out ports 173, 175, 177, power-in port 171, and vias 170 (various vias in the layered board 101 are not labeled "170" due to space constraints). As shown in FIG. 1, multiple portions (e.g., first portion 106, second portion 107, third portion 108, and/or the like) that are isolated collectively define the compartmentalized PCB 100. The layered board 101 of the compartmentalized PCB 100 includes multiple layers that can be made of one of or a combination of dielectric sections 141, data sections 111, 112, 113, power sections 121, 122, 123, and/or ground sections 131 (not all sections are labeled in FIG. 1 due to space constraints). In one example, a layer of the layered board 101 can include a data section 111 and a dielectric section 141. In another example, a layer of the layered board 101 can include a data section 111, a data section, and/or a dielectric section 141.

The compartmentalized PCB 100 can be part of a compute device (not shown) such as a computer, laptop, embedded appliance, etc. The modular form of the compartmentalized PCB 100 as defined by the portions 106, 107, 108 and the layered board 101 can protect data processed and software executed by the compute device (and/or the PCB 100) from unauthorized access. Therefore, the compartmentalized PCB 100 can protect an operation of the compute device (e.g., executing a code, routing data stream, and/or the like) against tampering and monitoring. In some implementations, the compute device may be the modular embedded compute appliance docking board as described in U.S. Pat. No. 10,712,778, entitled "Modular Embedded Compute Appliance Docking Board, And Methods And Systems For The Same", which is incorporated herein in its entirety by this reference. In some implementations, the compute device may include a housing as described in U.S. Pat. No. 10,775,856, entitled "Compute Device Housing With Layers Of Electromagnetic Interference Shields, And Device And Systems For The Same", which is incorporated herein in its entirety by this reference. In some implementations, the compute device may include a layered power filters as described in U.S. Pat. No. 10,869,394, entitled "Apparatus And Methods For Reducing Unintended Transport Of Data From Power Distribution Systems Using layered Power Filters", which is incorporated herein in its entirety by this reference. In some implementations, the compute device may include an embedded chassis with firmware as described in U.S. Pat. No. 11,100,230, entitled "Modular Embedded Chassis With Firmware For Removably Coupled Compute Devices, And Methods And The Systems For The Same", which is incorporated herein in its entirety by this reference. In some implementations, the compute device may include a secure compute device housing with sensors as described in U.S. Pat. No. 11,106,832, entitled "Secure Compute Device Housing With Sensors, And Methods And Systems For The Same", which is incorporated herein in its entirety by this reference.

The compartmentalized PCB 100 is a board that can mechanically support and electrically interconnect electrical components (e.g., a capacitor(s), a resistor(s), an inductor(s), and/or the like), electronic components (transistors, light emitting diodes, logic gate circuit, and/or the like), and/or electronic circuits (e.g., a microcontroller(s), an integrated circuit(s), a memory chip(s), a connectivity chip(s), a system-on-chip(s), a camera(s), and/or the like). The compartmentalized PCB 100 described herein can have isolated portions that are mutually exclusive and physically separate from each other. The compartmentalized PCB 100 can further include conductive tracks (copper tracks, aluminum tracks, silver tracks, carbon tracks, carbon fiber tracks, graphite tracks, graphene tracks, and/or the like), conductive layers (copper sheets, aluminum sheets, carbon sheets, carbon fiber sheets, graphite sheets, graphene sheets, and/or the like), insulating layers (e.g., porcelain sheets, mica sheets, plastic sheets, metal oxides, and/or the like), and/or the like.

Each portion (e.g., the first portion 106, the second portion 107, and the third portion 108 isolated from one another) can be configured to perform one or more primary functions such as, for example, generate power, generate data, process data, store data, communicate sensitive data, execute a software, and/or the like. Alternatively, two or more portions can be configured to perform the same function or an overlapping function in addition to another separate function(s). Moreover, each isolated portion can include an isolated data port or an isolated power port. The isolated data port can be configured to transfer only intended data without leakage (e.g., the transfer of unintended data and/or software-related information). Similarly, the isolated power port can be configured to transfer power without leakage (e.g., the transfer of unintended data and/or software-related information). Each portion can be isolated by electromagnetic interference (EMI) shielding and power protection from other portions and prevent the unintentional access or leakage of data or software into or out of that portion. In some instances, the isolated data port can include an isolated electrical connector (e.g., an isolated contact pad) that is connected to a via end portion (e.g., data-in port, data-out port) that terminates on an outer surface of the layered board 101. In one example, the isolated contact pad can be positioned on the via end portion using a lithography mask and deposited on the layered board 101 at the via end portion using an evaporator. In another example, the isolated contact pad can be defined on the via end portion using a PCB three dimension (3D) printer (e.g., a 3D-printed micro-electrical-mechanical system (MEMS)). In some instances, the isolated connector can include wire-to-board connectors, board-to-board connectors, SKEDD® connectors that can be hand plugged or soldered.

The dielectric sections 141 are the bulk portions of the layered board 101 that serve as a mechanical support to hold various components of the compartmentalized PCB 100. Material(s), size(s), and location(s) of the dielectric sections 141 can also be designed or fabricated such that various components of the compartmentalized PCB 100 are isolated (e.g., electrically, electromagnetically, and so forth). The material(s) of dielectric sections 141 can be or include insulating layers such as, for example, porcelain sheets, mica sheets, plastic sheets, and/or the like.

The data sections 111, 112, 113 can include electrical components and integrated circuits that can store, communicate, and/or process data. In one example, the data section 111 can include a memory (e.g., a flash memory) to store data. In another example, the data section 112 can include a memory and a microcontroller that collectively analyze data. In another example, the data section 113 can include a communication interface to electromagnetically transmit data.

The power sections 121, 122, 123 can include electrical components and electronic circuitry that can generate, conduct, and/or transform power. In one example, the power section 121 can include a radio frequency (RF) harvesting device that generates power from an EM field such as for example an ambient EM field. In another example, the power section 122 can include a transformer that changes a voltage of power.

The ground sections 131 can include a conductive material(s) that serves as reference point for voltage (electric potential) across one or more electronic circuitry in the compartmentalized PCB 100. The ground sections 131 can be located at separate layers such that no two ground sections 131 of two different portions (e.g., the first portion 106 and the second portion 107) are in the same layer. In some embodiments, the ground sections can be at the same layer and all connected to a common ground of the compartmentalized PCB.

The power-in port 171 of the compartmentalized PCB 100 can be connected to and/or operatively coupled to a power source (e.g., an untrusted power source; not shown) to receive power. The untrusted power source can be a device that generates power (e.g., a motor-generator), coverts power (e.g., a coil transformer), or a medium that conducts the power (e.g., a wire). In some instances, the power can be an alternating current (AC) electric power, a direct current (DC) electric power, an electromagnetic power, and/or the like. The power can have a set of characteristics such as, for example, a voltage, a wattage, a frequency, a current flow intensity, and/or the like. The power source can be "untrusted" in some instances in the sense that the user (or owner) of the compartmentalized PCB 100 does not have control over (or ownership of) of the untrusted power source, which can have unexpected characteristics, information and/or data. In some instances, the power from the power source can include noises, ripples, and/or unintended information/data encoded in the power. The unintended information/data can be, for example, induced to the power from the untrusted power source by an electromagnetic induction of a signal propagating in a data transfer link close to the untrusted power source. The power-in port 171 can be connected or operatively coupled, via vias 170, to a power section (e.g., power section 121) to provide power to operate the compartmentalized PCB 100 and/or to provide power operatively coupled to the compartmentalized PCB 100.

The data-in ports 172, 174, 176 and/or data-out ports 173, 175, 177 of the compartmentalized PCB 100 can, from one side, be connected to and/or operatively coupled to a data source (e.g., an untrusted compute device remote from the compartmentalized PCB 100) to receive data and/or transmit data respectively. The data-in ports 172, 174, 176 and/or data-out ports 173, 175, 177 of the compartmentalized PCB 100 can, from the other side, be connected and/or operatively coupled, via vias 170, to the data sections 111, 112, 113. In some embodiments, the data-in ports 172, 174, 176 can be configured for a bidirectional communication. For example, in some instances, the data-in port 172 can receive, from a source, data including a first key and transmit the data to the data section 111. The data section 111 can generated a second key in response to the first key and transmit the second key back to the source for authenticating communication between the source and the compartmentalized PCB 100.

The first data filter 151 and/or the second data filter 152 can be disposed on the compartmentalized PCB 100 and can be configured act as a data gateway between the portions 106, 107, 108 of the compartmentalized PCB 100. The first data filter 151 and/or the second data filter 152 can include a set of pins (e.g., two pins as shown) that can connect, via vias 170 to data section 111, 112, 113. The first data filter 151 and/or the second data filter 152 can further include digital filters, analog filters, integrated circuits, and/or the like, to prevent communication of a preset type of data. In one example, the first data filter 151 can (a) receive data from the data section 111 of the first portion 106, (b) filter the data at data filter 151 to generate filtered data, and (c) transmit or conduct the filtered data to the data section 112 of the second portion 107.

The first power filter 161 and/or the second power filter 162 can be disposed on the compartmentalized PCB 100 and can be configured act as a power gateway between the portions 106, 107, 108 of the compartmentalized PCB 100. The first power filter 161 and/or the second power filter 162 can include a set of pins (e.g., two pins as shown) that can connect, via vias 170, to power section 121, 122, 123. The first power filter 161 and/or the second power filter 162 can further include digital filters, analog filters, integrated circuits, and/or the like, to prevent untrusted power characteristics or communication of unintended data. In one example, the second power filter 161 can (a) receive power from the power section 122 of the second portion 107, (b) filter the data at power filter 162 to generate filtered data, and (c) transmit or conduct the filtered data to the power section 123 of the third portion 108.

In some embodiments, the first portion 106, the second portion 107, or the third portion 108 can include an integrated circuit (IC) mounted on top of the layered board 101. The IC can be configured to perform, for example, control procedures, arithmetic procedures, logical procedures, signal generation procedures, signal communication procedures, electronic charge storage procedures, and/or the like. In some instances, the IC can serve as an interface between a peripheral device and the compartmentalized PCB 100. The IC can typically integrate a large number (e.g., thousands, millions, and/or the like) of electronic components (e.g., metal-oxide-semiconductor (MOS) transistors, charged-coupled optical sensor, floating-gate memory cell, and/or the like) on a piece of semiconductor (e.g., silicon, germanium, gallium arsenide, and/or the like), insulator (silicon oxide, silicon nitride, aluminum nitride, and/or the like), and/or conductor (silver, copper, indium tin oxide, and/or the like). As number of ICs and peripheral devices coupled to the compartmentalized PCB 100 increase so too does the amount and different types of data and software present on them. The compartmentalized PCB 100 can mitigate risks associated with increasing volume of data and number device connected or couple to the compartmentalized PCB 100 by isolating portions 106, 107, 108 of the PCB (e.g., using vias 170 and dielectric sections 141) and filtering flow of data and power between the portion by using data filters 151, 152 and power filters 161, 162.

The vias 170 are channels built in the layered board 101 and can include electrically and/or thermally conductive medium to enable operation of an electrical component, electronic circuits, thermal control components, and/or the like built into the compartmentalized PCB 100. The vias 170 can, alternatively and/or in addition, include electrically and/or thermally insulating mediums to isolate portions (e.g., the first portion, the second portion, the second portion, and/or the like) of the compartmentalized PCB 100. The vias 170 can include, for example, through-hole via, a blind via, a buried via, a micro-via, stacked vias, staggered vias, and/or the like), and/or the like. Furthermore, he vias 170 as shown and described herein, can be configured to define an electromagnetic interference (EMI) shield portion. For example, in some embodiments the vias can be made of a medium that is electrically insulating and designed with a pattern that acts like an EMI shield for electromagnetic radiation at an operation frequency (e.g., radio frequency (RF), optical frequency, and/or the like).

As shown in FIG. 1, the vias 170 of the compartmentalized PCB 100 can include through-hole vias at boarder of each portion from the multiple portion to separate (e.g., physically separate) and/or isolate (e.g., electrically isolate) the multiple portions. In one example, as shown in FIG. 1, two through-hole vias can be defined in the layered board 101 in between pins of the data filter 151 and pins of the power filter 161 to separate and/or isolate the first portion 106 from the second portion 107. In another example, as shown in FIG. 1, two through-hole vias can be defined in the layered board 101 in between pins of the data filter 152 and pins of the power filter 162 to separate and/or isolate the second portion 107 from the third portion 108.

As shown in FIG. 1, the first power filter 161 and/or the second power filter 162 can be disposed between two adjacent portions of the compartmentalized PCB 100. Similarly, the first data filter 151 and/or the second data filter 152 can be disposed between two adjacent portions of the compartmentalized PCB 100. Therefore, separation and/or isolation of the first portion 106 from the second portion 107, and the second portion 107 from the third portion 108, can also imply that the first portion 106 is separated and/or isolated from the third portion 108. In some embodiments, however, when there are no vias directly positioned between the first portion 106 and the third portion 108, the first portions 106 is not necessarily separated and/or isolated from the third portion 108. For example, in some embodiments the first portion 106, the second portion 107, and the third portion 108 can be imprinted on the layered board 101 in a circular for or a triangular format such that while the second portion 107 is separated and isolated from both of the first portion 106 and the third portion 108, the first portion 106 is not separated and/or not isolated from the third portion 108.

FIG. 2 is a block diagram that illustrates a compartmentalized PCB 200, according to an embodiment. The compartmentalized PCB 200 can include isolated a first PCB compartments 201 (also referred to as "the first portion") and a second PCB compartments 211 (also referred to as "the second portion"), each handling data or software to be kept isolated. The first PCB compartments 201 and the second PCB compartments 211 can include an isolated data port 202 and an isolated data port 212, respectively, which can interconnect compartments of and/or peripheral devices connected to the compartmentalized PCB 200 such that unauthorized transfer of data or software between compartments is prevented. The first PCB compartments 201 and the second PCB compartments 211 can include an isolated power port 203 and an isolated data port 213 that transfer power among the compartments and the peripheral devices while preventing the unintentional transfer of data or software through the power supply/connections. In some instances, the compartments can be isolated electrically, electromagnetically, mechanically, optically, and/or the like, from each other and the peripheral connected to the compartmentalized PCB 200. The isolated data ports 202, 212 and isolated power ports 203, 213 do not allow any unauthorized or unintended transfer of data or software among compartments or any other parts of the computer system or its outside environment. In some embodiments, the first PCB compartments 201 and the second PCB compartments 211 may be interconnected in whatever architecture is described by the specific system design. The dashed lines shown in FIG. 2 represent optional connections merely for the purposes of illustration. For example, the first PCB compartments 201 and the second PCB compartments 211 can be interconnected via a data filter and/or a power filter (e.g., the data filter 151 and/or the power filter 161 as shown and described with respect to FIG. 1).

FIG. 3 is a flowchart of a method 300 for compartmentalization of a PCB, according to an embodiment. The method 300 can include transferring, at 301, data from a first portion of a compartmentalized PCB (similar to the compartmentalized PCB 100 shown and described with respect to FIG. 1) and a first layer from multiple layers of the compartmentalized PCB to a second portion of the compartmentalized PCB and a second layer from the multiple layers of the compartmentalized PCB. The first portion and the second portion of the compartmentalized PCB can be isolated (e.g., electrically isolated, electromagnetically isolated, and/or the like) from each other. In some implementations, the first portion can perform a first function and not a second function; the second portion can perform the second function but not the first function. In some implementations, the first function and the second function can be complementary functions such that by operating both the first portion and the second portion, a third function (e.g., a desired function) can be performed.

The method 300 can include filtering the data, at 302, during the transfer of data, to prevent or reduce data leakage from the first portion of the compartmentalized PCB to the second portion of the compartmentalized PCB. The filtering can be performed, for example, by a data filter that is included within an integrated circuit (IC) and is disposed between the first portion and the second portion of the compartmentalized PCB. The data filter can perform data filtering and/or signal conditioning during operation of the IC. The IC can have a first pin and a second pin that are operatively coupled (e.g., soldered) to a data port of the first portion of the compartmentalized PCB and a data port of the second portion of the compartmentalized PCB, respectively. The data port of the first portion can be defined by a via between the first layer and an outer surface of the compartmentalized PCB. Similarly, the data port of the second portion can be defined by a via between the third layer and an outer surface of the compartmentalized PCB.

In some implementations, the data filter can include an electrical-to-optical (e2o) converter, an optical fiber and an optical-to-electrical (o2e) converter. The e2o converter can be operatively coupled to the data port of the first portion of the compartmentalized PCB, and the o2e converter can be operatively coupled to the data port of the second portion of the compartmentalized PCB. In some instances, the e2o can be or include a light source (e.g., a light emitting diode, a laser, and/or the like) that converts electrical data of the first portion of the compartmentalized PCB to optical data. The data filter can further include an optical filter to convert the optical data to a filtered optical data and guide, via a waveguide (e.g., an optical fiber), the filtered optical data to the o2e converter. The o2e converter can be or include a photodetector that converts the filtered optical data to filtered electrical data.

The method can include, at 303, transferring power from the first portion of the PCB and a third layer from the multiple layers of the compartmentalized PCB to the second portion of the compartmentalized PCB and a fourth layer from the multiple layers of the compartmentalized PCB. The method can include, at 304, filtering the power, during the transfer of power, to isolate the power of the first portion of the compartmentalized PCB from the power of the second portion of the compartmentalized PCB. The filtering can be performed by a power filter operatively coupled to a power port of the first portion and a power port of the second portion of the compartmentalized PCB. The power filter can be configured to provide power isolation between the first portion and the second portion. The power port of the first portion can be defined by a via between the second layer and the outer surface of the compartmentalized PCB. Similarly, the power port of the second portion can be defined by a via between the fourth layer and the outer surface of the compartmentalized PCB.

The method can include, at 305, the compartmentalized PCB shields electromagnetic interference (EMI) between the first portion of the compartmentalized PCB and the second portion of the compartmentalized PCB. The shielding for the first portion of the compartmentalized PCB can be performed by a set of vias (e.g., at least one row of vias) disposed along an edge of the first portion of the compartmentalized PCB and by a set of vias (e.g., at least one row of vias) for the second portion of the compartmentalized PCB disposed along an edge of the second of the compartmentalized PCB. EMI shielding formed by a set of vias can also be referred to as via stitching, a via fence, or a picket fence. The size and spacing of the vias in the EMI shielding can be based on, for example, on the frequency of the circuit(s) of the relevant portions of the PCB. For example, the size and the spacing of the vias in the set of vias can be selected to act as short circuits and can be less and the wavelength/20 at the maximum operating frequency of the circuit(s) of the relevant portions of the PCB. The edge of the first portion of the compartmentalized PCB and the edge of the second portion of the compartmentalized PCB substantially abut each other. For example, substantially abutting can mean that there are no electronic components between the edge of the first portion and the edge of the second portion of the compartmentalized PCB.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
a printed circuit board (PCB) having a plurality of layers and including a first portion and a second portion mutually exclusive and physically separate from the first portion,
the first portion of the PCB having a data port and a power port, a first layer from the plurality of layers being associated with data of the first portion of the PCB, a second layer from the plurality of layers being associated with power of the first portion of the PCB and different from the first layer,
the second portion of the PCB having a data port and a power port, a third layer from the plurality of layers being associated with data of the second portion of the PCB and different from the first layer and the second layer, a fourth layer from the plurality of layers being associated with power of the second portion of the PCB and different from the first layer, the second layer and the third layer,
the first portion of PCB having a plurality of vias defining an electromagnetic interference (EMI) shield portion for the first portion of the PCB, the second portion of the PCB having a plurality of vias defining an EMI shield portion for the second portion of the PCB;
a power filter operatively coupled to the power port of the first portion of the PCB and the power port of the second portion of the PCB, the power filter configured to isolate power of the first portion of the PCB from the power of the second portion of the PCB; and
a data filter operatively coupled to the data port of the first portion of the PCB and the data port of the second portion of the PCB, the data filter configured to prevent data leakage from the first portion of the PCB to the second portion of the PCB.

2. The apparatus of claim 1, wherein the first portion of the PCB is configured to perform a first function and not a second function, the second portion of the PCB is configured to perform the second function and not the first function.

3. The apparatus of claim 1, wherein the first portion of the PCB is configured to perform processing functions and not storage functions, the second portion of the PCB is configured to perform storage function and not processing function.

4. The apparatus of claim 1, wherein:
the data port of the first portion of the PCB is defined by a via between the first layer and an outer surface of the PCB,
the power port of the first portion of the PCB is defined by a via between the second layer and the outer surface of the PCB,
the data port of the second portion of the PCB is defined by a via between the third layer and an outer surface of the PCB, and
the power port of the second portion of the PCB is defined by a via between the fourth layer and the outer surface of the PCB.

5. The apparatus of claim 1, wherein:
the power port of the first portion of the PCB is defined by a via between the second layer and the outer surface of the PCB,
the power port of the second portion of the PCB is defined by a via between the fourth layer and the outer surface of the PCB,
the power filter being operatively coupled to the power port of the first portion of the PCB and the power port of the second portion of the PCB to provide power isolation between the first portion of the PCB and the second portion of the PCB.

6. The apparatus of claim 1, wherein:
the data port of the first portion of the PCB is defined by a via between the first layer and an outer surface of the PCB,
the data port of the second portion of the PCB is defined by a via between the third layer and an outer surface of the PCB,
the data filter being operatively coupled to the data port of the first portion of the PCB and the data port of the second portion of the PCB to prevent unintentional transfer of data between the first portion of the PCB and the second portion of the PCB.

7. The apparatus of claim 1, wherein the data filter is included within an integrated circuit (IC) that performs data filtering and/or signal conditioning during operation of the IC, the IC having a first pin operatively coupled to the data port of the first portion of the PCB, the IC having a second pin operatively coupled to the data port of the second portion of the PCB.

8. The apparatus of claim 1, wherein:
the plurality of vias for the first portion of the PCB define at least one row of vias along an edge of the first portion of the PCB,
the plurality of vias for the second portion of the PCB define at least one row of vias along an edge of the second of the PCB,
the edge of the first portion of the PCB and the edge of the second portion of the PCB substantially abutting each other.

9. An apparatus, comprising:
a printed circuit board (PCB) having a plurality of layers and a plurality of portions, each portion from the plurality of portions being mutually exclusive and physically separate from the remaining portions from the plurality of portions,
the plurality of layers including a plurality of data layers and a plurality of power layers, each portion from the plurality of portions of the PCB including a data layer from the plurality of data layers and a power layer from the plurality of power layers,
each data layer from the plurality of data layers being mutually exclusive from remaining data layers from the plurality of data layers and from each power layer from the plurality of power layers, each power layer from the plurality of power layers being mutually exclusive from remaining power layers from the plurality of power layers and from each data layer from the plurality of data layers,
each portion of the PCB having a plurality of vias defining an electromagnetic interference (EMI) shield portion for that portion of the PCB;
a plurality of power filters, each power filter from the plurality of power filters operatively coupled to at least two adjacent portions of the PCB and configured to isolate power between those at least two adjacent portions of the PCB; and
a plurality of data filters, each data filter from the plurality of data filters operatively coupled to at least two adjacent portions of the PCB and configured to prevent data leakage those at least two adjacent portions of the PCB.

10. The apparatus of claim 9, wherein:
the PCB includes a plurality of data ports and a plurality of power ports, each portion from the plurality of portions having at least one data port from the plurality of data ports and at least one power port from the plurality of ports, each power filter from the plurality of power filters being operatively coupled to the at least two adjacent portions of the PCB by the at least one power port for each of those two adjacent portions of the PCB, each data filter from the plurality of data filters being operatively coupled to the at least two adjacent portions of the PCB by the at least one data port for each of those two adjacent portions of the PCB.

11. The apparatus of claim 9, wherein each portion from the plurality of portions is configured to perform a function from a plurality of functions and not remaining functions from the plurality of functions.

12. A method, comprising:

transferring data from a first portion of a printed circuit board (PCB) and a first layer from a plurality of layers of the PCB to a second portion of the PCB and a second layer from the plurality of layers of the PCB, the first portion of the PCB being mutually exclusive and physically separate from the second portion of the PCB, the first layer being different from the second layer;

filtering, during transferring data, the data to prevent data leakage from the first portion of the PCB to the second portion of the PCB;

transferring power from the first portion of the PCB and a third layer from the plurality of layers of the PCB to the second portion of the PCB and a fourth layer from the plurality of layers of the PCB, the third layer being different from the first layer and the second layer, the fourth layer being different from the first layer, the second layer and the third layer;

filtering, during transferring power, the power to isolate power of the first portion of the PCB from the power of the second portion of the PCB; and shielding electromagnetic interference (EMI) between the first portion of the PCB and the power of the second portion of the PCB.

13. The method of claim 12, wherein the shielding is performed by a plurality of vias for the first portion of the PCB disposed in at least one row of vias along an edge of the first portion of the PCB and by a plurality of vias for the second portion of the PCB disposed in at least one row of vias along an edge of the second of the PCB, the edge of the first portion of the PCB and the edge of the second portion of the PCB substantially abutting each other.

14. The method of claim 12, further comprising:

performing a first function at the first portion of the PCB and not a second function; and performing the second function at the second portion of the PCB and not the first function.

15. The method of claim 12, wherein:

a power port of the first portion of the PCB is defined by a via between the second layer and the outer surface of the PCB, a power port of the second portion of the PCB is defined by a via between the fourth layer and the outer surface of the PCB, the power filtering being performed by a power filter operatively coupled to the power port of the first portion of the PCB and the power port of the second portion of the PCB to provide power supply isolation between the first portion of the PCB and the second portion of the PCB.

16. The method of claim 12, wherein:

a data port of the first portion of the PCB is defined by a via between the first layer and an outer surface of the PCB, a data port of the second portion of the PCB is defined by a via between the third layer and an outer surface of the PCB, the data filtering being performed by a data filter operatively coupled to the data port of the first portion of the PCB and the data port of the second portion of the PCB to prevent unintentional transfer of data between the first portion of the PCB and the second portion of the PCB.

17. The method of claim 12, wherein the data filtering is performed by an integrated circuit (IC) having a first pin operatively coupled to a data port of the first portion of the PCB, and having a second pin operatively coupled to a data port of the second portion of the PCB.

18. The method of claim 12, wherein the data filtering includes:

converting the data from an electrical signal associated with the first portion of the PCB to an optical signal;

sending the optical signal via an optical fiber; and converting the optical signal to an electric signal associated with the second portion of the PCB.

* * * * *